United States Patent [19]
Baraghimian et al.

[11] Patent Number: 5,970,171
[45] Date of Patent: Oct. 19, 1999

[54] APPARATUS AND METHOD OF FUSING THE OUTPUTS OF MULTIPLE INTELLIGENT CHARACTER RECOGNITION (ICR) SYSTEMS TO REDUCE ERROR RATE

[75] Inventors: Gregory A. Baraghimian, Sterling; Glenn E. Host, Alexandria, both of Va.

[73] Assignee: Hughes Aircraft Company, Los Angeles, Calif.

[21] Appl. No.: 08/515,088

[22] Filed: Aug. 14, 1995

[51] Int. Cl.$^6$ .............................. G06K 9/00; G06K 9/62; G06K 9/74

[52] U.S. Cl. ........................................... 382/187; 382/228

[58] Field of Search ................................. 382/229, 224, 382/225, 226, 227, 160, 209, 215, 309, 310, 161, 101; 395/3, 20

[56] References Cited

U.S. PATENT DOCUMENTS

| | | | |
|---|---|---|---|
| 4,580,142 | 5/1986 | Bednar | 382/226 |
| 4,876,731 | 10/1989 | Loris et al. | 382/229 |
| 5,455,872 | 10/1995 | Bradley | 382/228 |
| 5,519,786 | 5/1996 | Courtney et al. | 382/159 |

OTHER PUBLICATIONS

"A Fuzzy Logic System for the Detection and Recognition of Handwritten Street Numbers", Paul Gader et al., IEEE Transactions on Fuzzy Systems, vol. 3 No. 1, Feb. 1995, pp. 83–95.

"A Method of combining multiple experts for the recognition of unconstrained handwritten numerals, Huang P. Suen", IEEE Transactions on pattern analysis and machine intelligence, vol. 17, No. 1, Jan. 1995, pp. 90–94.

"Handwritten numeral recognition with neural networks and information fusion", Cao et al., IEEE Circuits and Systems, Midwest sysmposium, pp. 569–572, 1994.

"Methods of combining multiple classifiers and their applications to handwriting recognition", Yu et al., IEEE Transactions on Systems, Man, and Cybernetics, vol. 22, No. 3, pp. 418–435, May/Jun. 1992.

"Combination of Multiple Classifiers with Measurement Values", Huang, Y.S. and Suen, C. Y., Proceedings of the Second International Conference on Document Analysis and Recognition, Conference date: Oct. 20–22, 1993, pp. 598–601, IEEE Comput. Soc. Press.

"Decision Combination in multiple classifier systems", Ho et al., IEEE Transactions on Pattern Analysis and Machine Intelligence, vol. 16, No. 1, pp. 66–75, Jan. 1994.

*Primary Examiner*—Yon Couso
*Assistant Examiner*—Ha Tran Nguyen
*Attorney, Agent, or Firm*—G. S. Grunebach; M. W. Sales; W. K. Denson-Low

[57] ABSTRACT

An ICR fuser includes a set of fusion rules for combining the outputs of multiple ICR systems. Each ICR system operates on a digital image to extract image component strings and provide a set of multiple candidate character strings and their associated confidence values. Each rule includes a test for determining whether that rule applies to the current ICR system outputs, a membership function for selecting a fused character string, and a confidence equation for assigning it a fused confidence value. The rules partition a decision space into subspaces to reduce the error rate between the fused character string and the image component string.

17 Claims, 7 Drawing Sheets

RULE 1:
  Test
   $C_U = \{X_U\}$, $C_L = \{X_L\}$, $C_M = \{X_M\}$
   where $X_C = X_U = X_L = X_M$.

f()
   select  $X = X_C$ conf(X)
   $$\text{conf}(X) = \text{max\_conf\_x} + \frac{1 - \text{max\_conf\_x}}{2}$$
   where $\text{max\_conf\_x} = \max\{\text{conf}\{X_U\}, \text{conf}\{X_L\}, \text{conf}\{X_M\}\}$.

RULE 2:
  Test
   $C_U = \{X_U\}$, $C_M = \{X_M\}$, $C_L = \{\emptyset\}$, where $X_C = X_U = X_M$
   OR
   $C_U = \{\emptyset\}$, $C_M = \{X_M\}$, $C_L = \{X_L\}$, where $X_C = X_U = X_M$ f()
   select  $X = X_C$ conf(X)
   $$\text{conf}(X) = \text{max\_conf\_x} + \frac{1 - \text{max\_conf\_x}}{2}$$
   where $\text{max\_conf\_x} = \max\{\text{conf}\{X_U\}, \text{conf}\{X_L\}, \text{conf}\{X_M\}\}$.

RULE 3:
  Test
   $\max(\text{conf}(X_j)) < 0.5 \; \forall \; X_j \in C_U, C_L, C_M$.

f()
   $X = X_j$ with the highest $\text{conf}(X_j)$ conf(X)
   $$\text{conf}(X) = \frac{\text{conf}(X_j)}{1 + \text{num}\{C_U\} + \text{num}\{C_L\} + \text{num}\{C_M\}}$$

FIG.8a

RULE 4:
Test
   a) $C_U \cup C_L \neq \{\emptyset\}$ and $C_M = \{\emptyset\}$
   b) $C_M \neq \{\emptyset\}$, $C_U = C_U = \{\emptyset\}$ f()
   a) $X = X_j \in C_U \cup C_L$ with the highest $conf(X_j)$
   b) $X = X_j \in C_M$ with the highest $conf(X_j)$ conf(x)
   a) $conf(X) = max\_conf\_x - \dfrac{max\_conf\_x - 0.5}{2}$
      where $max\_conf\_x = max(conf\{X_j\})$ b) $conf(X) = conf(X^j) - \dfrac{conf(X_j) - 0.5}{2}$ RULE 5:
Test
   $C_U \cap C_L = \{X_U\}$ and/or $C_L \cap C_M = \{X_L\}$ f()
   $X = X_U$ if $max(conf\{X_U\}) > max(conf\{X_L\})$ else, $X = X_L$ conf(x)
   $conf(X) = max\_conf\_x + \dfrac{1 - max\_conf\_x}{2}$
   where $max\_conf\_x = max\{conf\{X_U\}, conf\{X_L\}\}$ RULE 6:
Test
   Default f()   $X = X_j$ with the highest $conf(X_j)$ conf(x)
   $conf(X) = conf(X_j)$

FIG.8b

APPARATUS AND METHOD OF FUSING THE OUTPUTS OF MULTIPLE INTELLIGENT CHARACTER RECOGNITION (ICR) SYSTEMS TO REDUCE ERROR RATE

BACKGROUND OF THE INVENTION

1. Field of the Invention

The present invention generally relates to intelligent character recognition (ICR) systems, and more specifically to an apparatus and method for fusing the results of multiple ICR systems to reduce the system's error rate.

2. Description of the Related Art

There are many instances in which printed text (hardcopy) must be converted to computer readable text (softcopy). For example, tax, census and insurance data are usually provided on standardized forms. Traditionally, a key punch operator would input the data from the forms into the computer so that the data could be processed and compiled into a data base. Occasionally entire documents will have to be entered into a computer. This is very slow and tedious work that leads to operator error.

In theory, ICR systems can be used to automatically recognize printed text (machine or handwritten) and convert it into computer readable text, e.g. an ASCII character format that is compatible with word processors such as Microsoft Word® or WordPerfect®. However, in practice the problem of recognizing and accurately discriminating printed text is very difficult. The result is ICR systems with high error rates that still require key punch operators to input a significant portion of the data.

To improve error rates and reduce the amount of data the key punch operator must enter, ICR systems are custom designed for specific problems such as processing standardized forms and reading mailing addresses. These types of problems are much easier because the physical location and classification of the printed text are known. For example, a car insurance form may have designated boxes for a person's name, address and occupation and the car's make and model. The ICR system knows approximately where to look for the text and can use different specially designed databases for each of the classes of printed text. The databases use a limited dictionary of words or numbers, which increases the confidence with which a word or "character string" is selected. As a result, both the ICR system's error rate and the necessary user interaction are reduced.

As used in ICR systems, the term "confidence value" reflects a subjective belief that a character or string matches its counterpart in the original document, and is typically assigned a value between 0 and 1. The confidence value is not a rigorous mathematical indicator, but in general a high confidence value will tend to indicate a lower probability of error and a low confidence value will tend to indicate a higher probability of error.

A number of companies including Mitek Systems, Inc., Nestor, Inc., Bell & Howell, Inc., Calera, Inc., Matra, Inc., and AEG, Inc. produce proprietary ICR systems that recognize hand or machine printed numeric, upper case alpha, upper/lower case alpha, lower case alpha, and punctuation marks. An optical scanner is used to digitally scan a document to create a digital image. The printed text in the document is represented as pixel values in the digital image. The ICR system segments the pixel values first into strings of image components (words) and then into the individual image components (characters). Once segmented, the ICR system recognizes each individual image component as multiple candidate characters having associated confidence values. The ICR system then regenerates candidate character strings from the candidate characters and assigns each string a confidence level. Commercial-off-the-shelf ICR systems output the string with the highest confidence value. If the confidence value exceeds a threshold, the string is accepted and sent to the data base. Otherwise, the string is rejected and the key punch operator is prompted to visually identify the string from the digital image and enter it into the computer.

To reduce the error rate, we believe that many of these systems use an internal fusion process to combine the outputs of multiple different ICR systems. This allows each ICR system to detect a limited character subset of the complete ASCII character set. This improves the accuracy of each ICR system. Alternately, multiple ICR systems that detect the same subset but which are provided by different vendors, and hence operate off of different recognition kernels, can be combined to improve performance.

Because these systems are proprietary, we do not know the details of the individual ICR systems or the specific fusion algorithms. However, we believe that the existing ICR systems use one of four known approaches: 1) a voter system, 2) probability aggregation, 3) belief combination or 4) fuzzy logic. In a voter system all of the ICR systems are treated as equal and the string that occurs in a majority/plurality of the outputs is selected. In a probability aggregation approach, the relative weight given to each ICR system is based on its average performance. In belief combination, each ICR system provides a range of "possibility" (belief) assignments as opposed to a fixed probability assignment. In fuzzy logic words such as "somewhat" or "a lot" are used to describe the ICR systems' relative strengths. The fuzzy network then converts these words into numeric values to make a decision. Although these fusion methods generally improve the system's error rate, more improvement is needed to reduce the error rate even further and make ICR systems commercially feasible.

SUMMARY OF THE INVENTION

The present invention seeks to provide an ICR fuser and method that reduces the error rate of a character recognition system.

This is accomplished with an ICR fuser that combines the outputs of multiple ICR systems. Each ICR system operates on a digital image to extract image component strings and provide a set of multiple candidate character strings and their associated confidence values. The permutations of these ICR system outputs define a decision space.

The ICR fuser includes a set of fusion rules that partition the decision space into subspaces. Each rule includes a test for determining whether that rule applies to the current ICR system outputs, a membership function f( ) for selecting a fused character string, and a confidence equation conf( ) for assigning it a fused confidence value. The fused confidence values are boosted and reduced relative to the string's associated confidence value in those rules whose subspaces represent combinations of ICR system outputs that tend to produce correct and incorrect matches between the fused character string and the image component string, respectively.

For a better understanding of the invention, and to show how the same may be carried into effect, reference will now be made, by way of example, to the accompanying drawings.

DETAILED DESCRIPTION OF THE INVENTION

The present invention provides a rule based fusion system that combines the outputs from multiple ICR systems to reduce the error rate, i.e. the mismatch rate between the fused character string and the printed text, and to reduce the amount of user interaction required. Each ICR system is capable of outputting a set of multiple candidate character strings and their associated confidence values. These types of ICR systems are available from the previously named ICR companies on a special order basis. The fusion rules select and output a fused character string and a fused confidence value.

The ICR systems are preferably designed to detect a subset of the ASCII character system. As a result, a particular ICR system will detect characters from its associated subset with relatively high confidence values. The possible permutations of the multiple candidate character strings and their confidence values define a decision space. Knowing the subsets that the ICR systems are designed to detect, the fusion rules are selected to partition the decision space into respective subspaces that identify combinations of ICR system outputs that tend to produce correct and incorrect matches.

Each rule includes a test for determining whether the current outputs from the ICR systems lie within that rule's subspace. A membership function selects the fused character string from those candidate character strings that satisfy the test, typically the string having the maximum confidence value. A confidence value equation computes the fused confidence value for the selected string. In subspaces which tend to produce fused character strings that correctly and incorrectly match the original text, the equations respectively boost and reduce the confidence value of the selected string.

Figure 1:
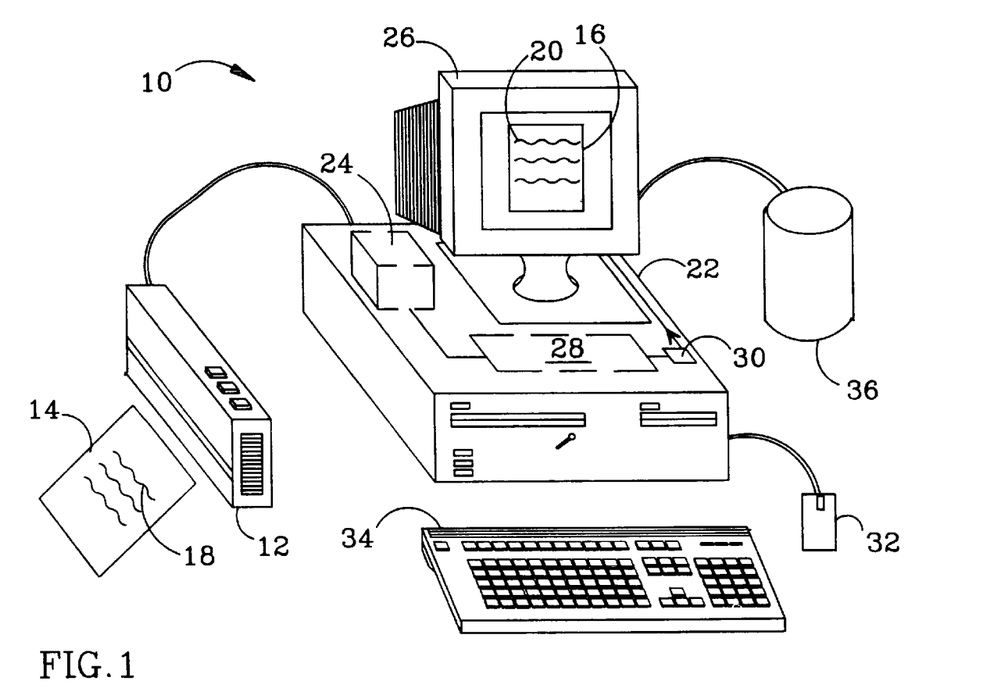
FIG. 1 is a perspective view of a character recognition system in accordance with the present invention.

As shown in FIG. 1, a character recognition system 10 includes an optical scanner 12 for scanning a printed document 14 such as a standardized form and outputting a digital image 16. The document 14 includes printed alpha/numeric text 18 (machine or hand printed) such as name, address, and occupation which is converted to image component strings 20 in the digital image 16. In this embodiment, the scanning and processing is done locally so that the digital image 16 is transmitted directly to a computer 22 where it is stored on its hard drive 24 and displayed on a display 26. Alternately, the documents 14 may be scanned at a remote location and stored in the digital format on a storage medium such as a floppy disk. The disk is then sent to a processing center where the digital data is downloaded onto computer 22.

The computer 22 is programmed with a fused ICR system 28 that recognizes the image components 20 and converts them into a fused character string 30. If the string's confidence value is too low, a key punch operator uses a mouse 32 and keyboard 34 or alternately a voice recognition system to override the ICR system 28 and punch in the character string shown on display 26. The fused and user generated character strings are transmitted to a database 36 for archiving and processing. The database 36 might be a remote global database that receives input from many local systems or alternately, it may be stored on the computer's own hard drive 24.

Figure 2:
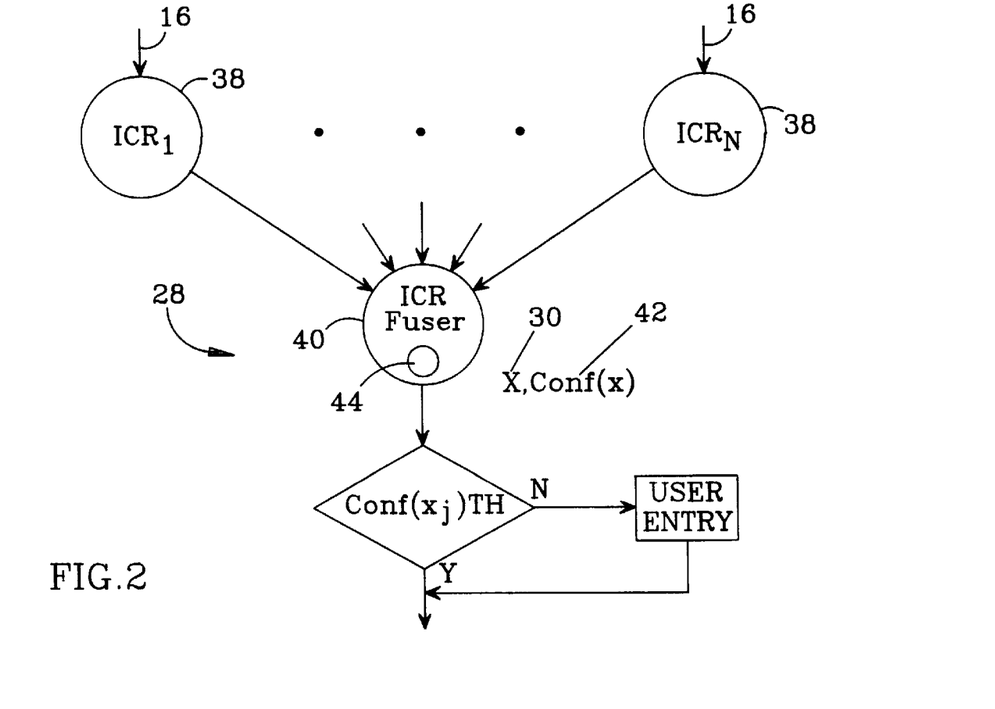
FIG. 2 is a block flowchart of the fusion system.

As shown in FIG. 2, the fused ICR system 28 includes multiple ICR systems 38 and an ICR fuser 40 which together recognize the image component strings 20 from the digital image 16 and convert them into the fused character string 30 and its associated confidence value 42. Each ICR system 38 receives the digital image 16 as input and produces sets $C_j$ of candidate character strings $X_{j1}, X_{j2}, \ldots X_{jm}$ and their confidence values $\text{conf}(X_{j1}), \text{conf}(X_{j2}), \ldots \text{conf}(X_{jm})$ where j is the index of the particular ICR system and m is the number of recognized strings. M can have different values for each set. The ICR fuser 40 uses a set of rules 44 to select the fused character string X 30 from the candidate character strings $X_{j1}, X_{j2}, \ldots X_{jm}$ for all the ICR systems and assign it a fused confidence value $\text{conf}(X)$ 42, which is a function of the ICR systems' $\text{conf}(X_{j1}), \text{conf}(X_{j2}), \ldots \text{conf}(X_{jm})$.

The fused ICR system 28 compares the fused confidence value $\text{conf}(X)$ to a threshold confidence value. The fused character string X is rejected if the confidence value is too low. If rejected, the user is prompted to input the correct string. Selection of the threshold value depends on several factors including the acceptable error rate, the performance of the individual ICR systems and the performance of the ICR fuser. A higher threshold value will reduce the overall error rate of the system but will require the user to input more of the data.

Figure 3:
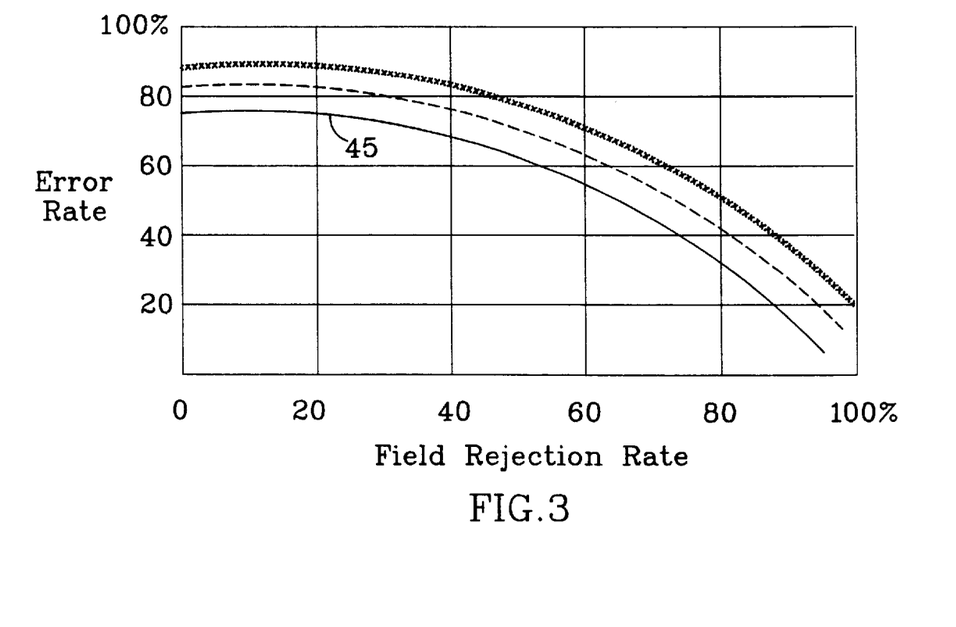
FIG. 3 is a plot of the error rate versus field rejection rate.

FIG. 3 plots an error rate curve 45 versus field rejection rate for the fused output. The error rate curves for the individual ICR systems are also plotted and are consistently higher than the fused result. For purposes of error rate computation, the field rejection rate is the percentage of the fused character strings, which have the lowest confidence values, that are removed from the computation. For example, a field rejection rate of 60% means that the 60% of the fused strings having the lowest confidence values are rejected. Thus, the error rate is only based on the best 40% of the fused strings. A field rejection rate of 0% (full range) means that the error rate is computed from all of the fused strings. Consequently, the error rate decreases as the field rejection rate increases. Furthermore, the area under curve 45 represents the average error rate over the full range of the recognition system.

The end user of the recognition system will typically specify an acceptable error rate or field rejection rate. The field rejection rate also indicates what percentage of the data processed by the recognition system will have to be entered by the key punch operator. Thus, lowering error rate curve 45 will reduce the amount of data that must be manually entered for a given error rate.

The threshold confidence value shown in FIG. 2 is set so that the desired percentage of fused character strings are rejected. The fused confidence values are remapped so that they have a uniform distribution to match that of the field rejection rate. The threshold confidence value is then found by executing the inverse remapping on the desired field rejection rate.

Figure 4:
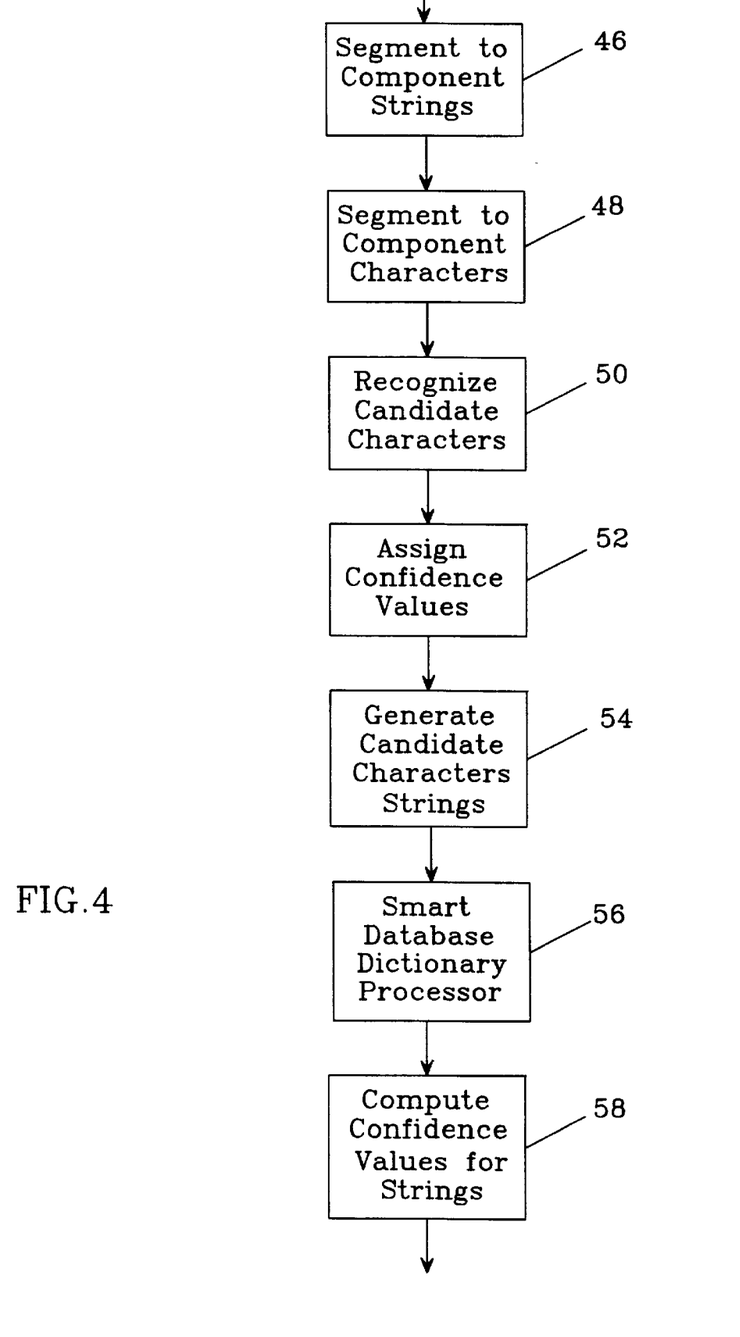
FIG. 4 is a flowchart for a ICR system.

FIG. 4 is a high level flowchart of a typical ICR system 38. Because the ICR systems are proprietary their details are unavailable. In step 46, the ICR system segments the digital image into successive image component strings. The different ICR systems may segment the same printed alpha/numeric string into different component strings. This increases the chance that the correct character string will be produced by one of the ICR systems, which has the effect of reducing the error rate. In step 48, the ICR system segments each component string into its constituent components. If properly segmented, each component should correspond to a single alpha/numeric character. Next, the ICR system recognizes (step 50) the component as multiple possible characters and assigns each character a confidence value (step 52).

The ICR system includes a trained classifier such as a neural network that maps each image component to multiple characters and assigns the confidence values. The classifier is trained by presenting known image components until the classifier learns to correctly recognize them with preferably high confidence values. Classifier performance naturally increases when the number of image components it must recognize is reduced. This is why ICR systems that detect limited subsets of the ASCII character set are preferred.

In step 54, the ICR system generates the candidate character strings $X_{j1}, X_{j2}, \ldots X_{jm}$ from the individual characters. This is done by first rejecting all of the individual characters whose confidence values are below a threshold value and then by forming all of the permutations for the remaining characters. In step 56, the candidate strings are passed to a smart database dictionary processor which can either accept the candidate string, modify it to match a string in the data base or reject it completely. This removes strings that are nonsensical such as "qxezy" and fixes string such as "enginear" to "engineer." Lastly, in step 58, the ICR system assigns each string its confidence value $conf(X_{j1})$, $conf(X_{j2})$, ... $conf(X_{jm})$ based on the individual character confidence values.

Figure 5:
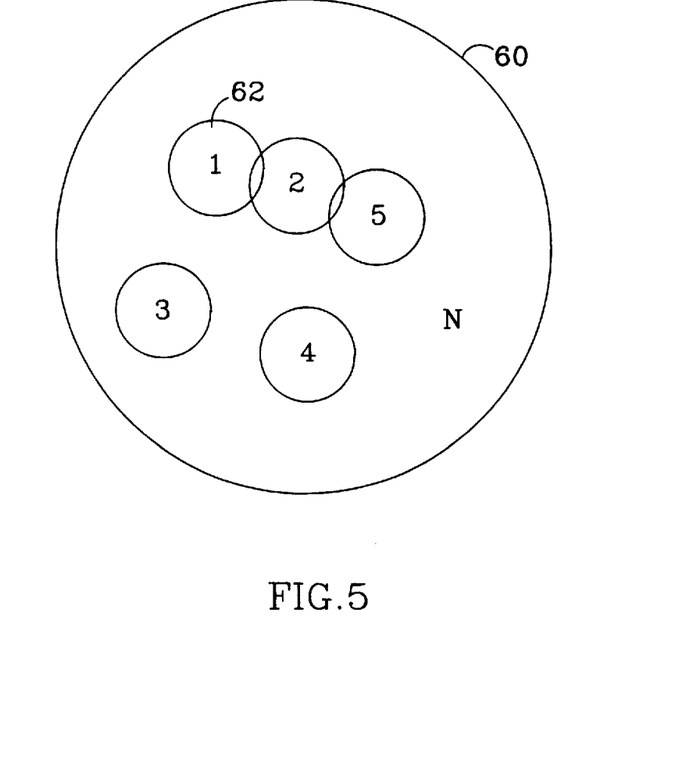
FIG. 5 is a Venn diagram illustrating the decision space for multiple ICR systems and the subspace partition in accordance with the present invention.

FIG. 5 is a Venn diagram of the decision space 60 produced by the ICR systems in a particular recognition system. The decision space 60 is formed by taking all of the possible permutations of candidate strings $Xj_1, X_{j2}, \ldots X_{jm}$ and their confidence values $conf(X_{j1})$, $conf(X_{j2})$, ... conf $(X_{jm})$. The fusion rules partition the decision space 60 into n subspaces 62, which represent different combinations of the ICR systems' candidate strings and associated confidence values.

The fusion rules are preferably selected to create subspaces 62 that identify combinations from which the selected fused character string tends to either have a high or a low probability of being a correct match. Thus, the actual confidence value of a fused character string from a high probability subspace is higher than its initially assigned value. In these subspaces, the outputs of the ICR systems reinforce each other which increases the confidence with which a particular string is recognized. Conversely, the actual confidence value in a low probability subspace is lower than the initially assigned value. In these spaces, the outputs of the ICR systems are not in agreement, which tends to dilute the confidence of any one ICR system or string.

The result of partitioning the decision space 60 as function of the multiple candidate strings and their associated confidence values is 1) to select the best candidate string, and 2) to assign that string a more accurate confidence value. Thus, strings with high confidence values which tend to match the original text are accepted and the strings with low confidence value which tend to be wrong are rejected. This reduces the area under error rate curve 45 in FIG. 3, and thus reduces the system's average error rate.

Figure 6:
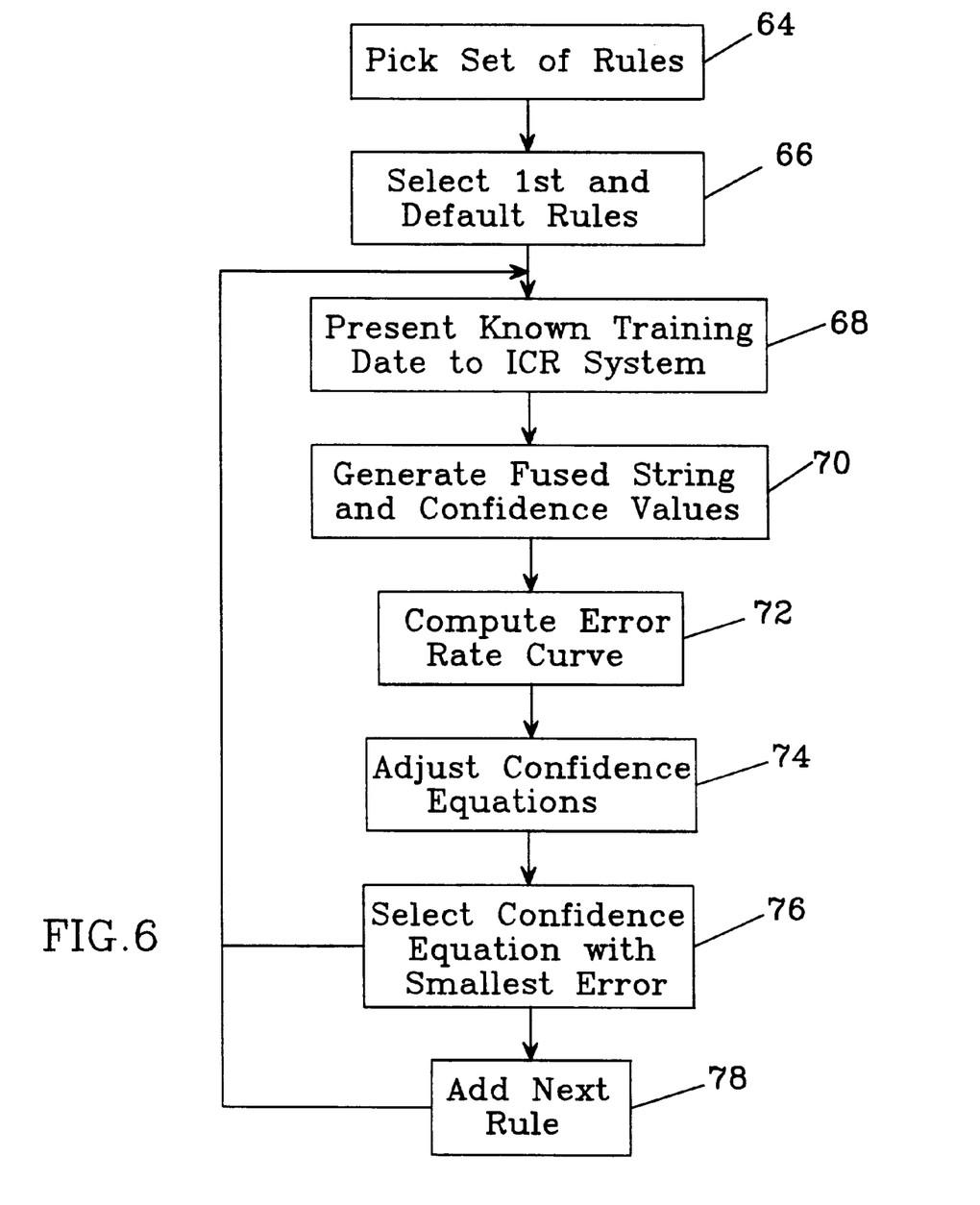
FIG. 6 is a flowchart for generating and training a set of fusion rules.

FIG. 6 is a flowchart for generating and training the set of fusion rules 44. In step 64, the designer selects a set of n rules including a default rule to partition the decision space. Each rule comprises 1) a test for determining if that rule should be applied to the current ICR system outputs, i.e. do those outputs lie in the rule's subspace?, 2) a membership function for selecting the fused character string from the candidate character strings that satisfy the test, and 3) a confidence equation for computing the fused confidence value. The default rule selects the single highest confidence string and preferably leaves its confidence value unchanged. The designer preferably selects the rules in descending order according to their effect on the error rate curve 45 shown in FIG. 3.

The designer selects the rules' tests based on the subsets that the ICR systems detect. The membership function preferably selects the candidate character string having the highest confidence value that satisfies the test as the fused character string. The confidence equations are initially configured to set the fused confidence value equal to the selected string's confidence value. Training adjusts the confidence equations to either boost or reduce the fused confidence values. In some case, the equations may remain unchanged.

To train the set of rules, the first and default rules are selected and the remaining rules are suppressed (step 66). In step 68, a set of know training data is presented to the ICR systems which produce the candidate character strings and confidence values. In step 70, the ICR fuser generates a fused character string and assigns it a confidence value for each piece of training data. The error rate curve 45 as shown in FIG. 3 is generated in step 72. The average error rate for the initial confidence equation is the area under curve 45. In step 74, the confidence equation is adjusted to first boost and then reduce the fused confidence value for the first rule. The amount of boost/reduction is preferably a fraction of the confidence value itself and is bounded such that the fused confidence value is always between 0 and 1. The size of the fraction is determined by trial and error during training.

Steps 68, 70 and 72 are repeated for the boosted and reduced values to produce three average error rates for rule 1. In step 76, the confidence equation that produced the lowest of the three rates is selected. In step 78, the next rule in the set is added to the first and default rules. Steps 68 through 76 are then repeated to select the confidence equation that produces the smallest error rate. This is repeated until all n rules have been trained.

Figure 7:
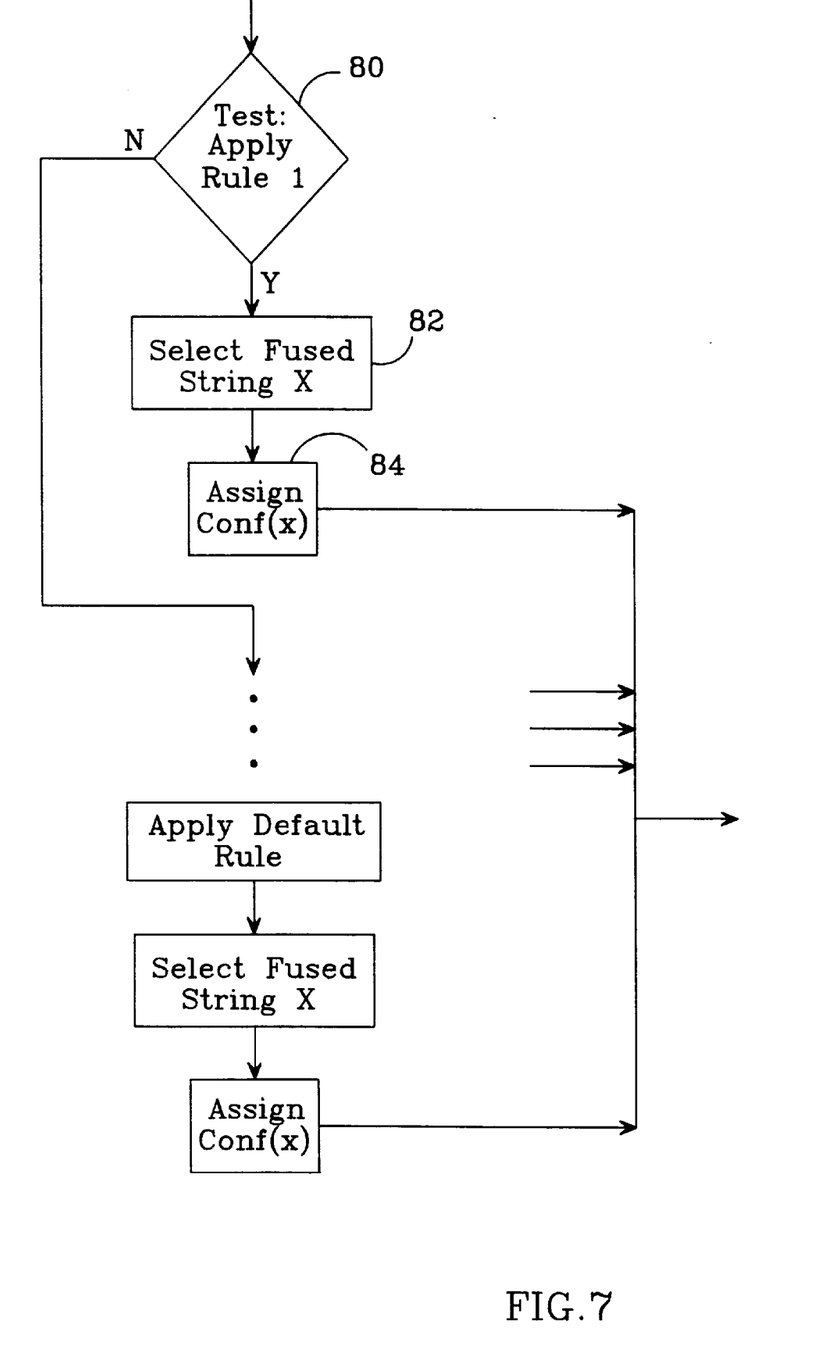
FIG. 7 is a flowchart for executing the set of fusion rules.

FIG. 7 is a flowchart for executing the set of fusion rules. In step 80, the sets of candidate character strings and confidence values are presented to the first rule which executes its test to see if the ICR system outputs lie within its subspace. If the test is satisfied, the membership function is executed to select fused character string X (step 82) and the confidence equation is computed to assign the fused confidence value (step 84). Otherwise the ICR outputs are passed to the second rule and so forth.

Figure 8A:
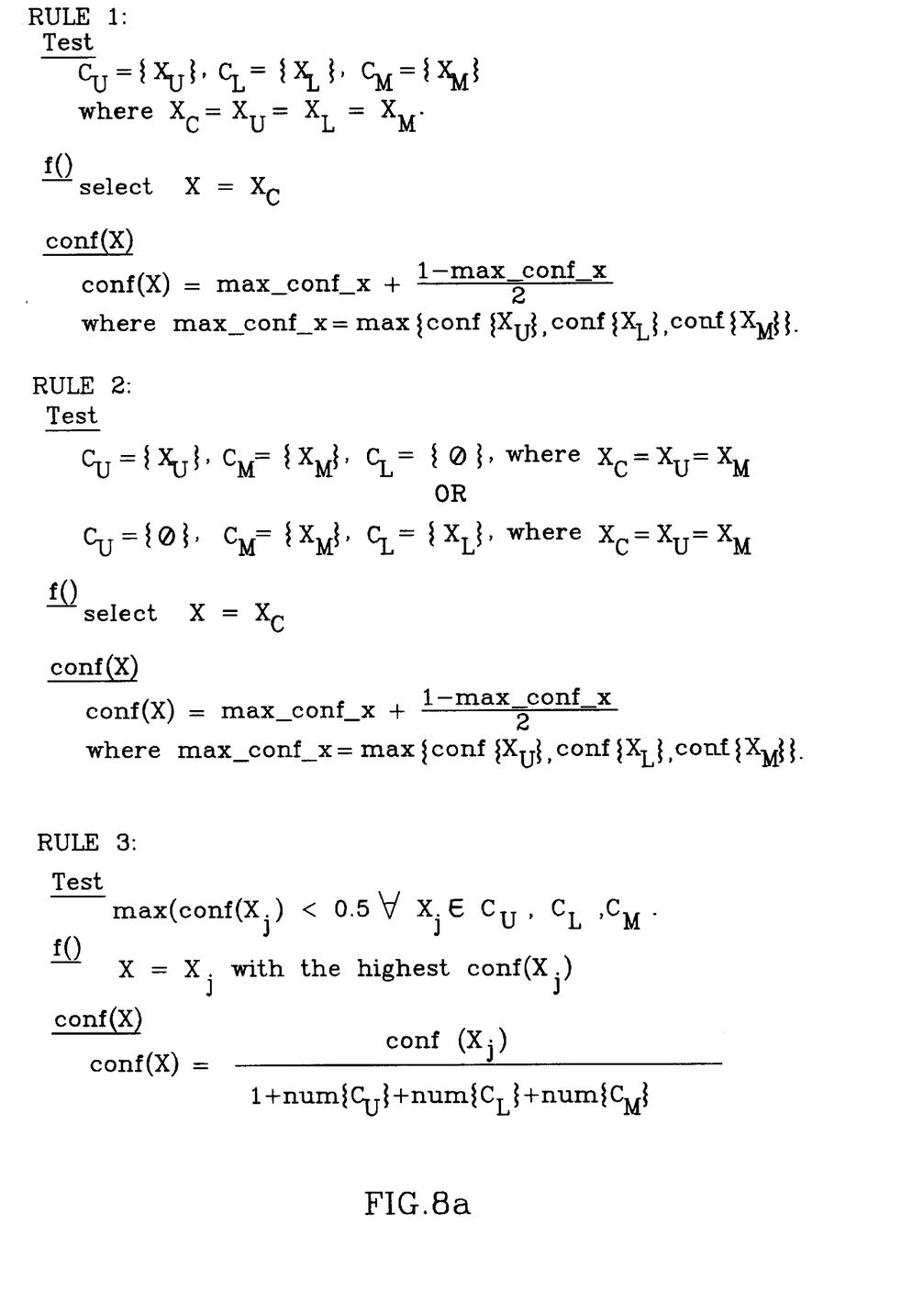
FIGS. 8a and 8b are a table of a set of fusion rules for a particular embodiment of the invention.
Figure 8B:
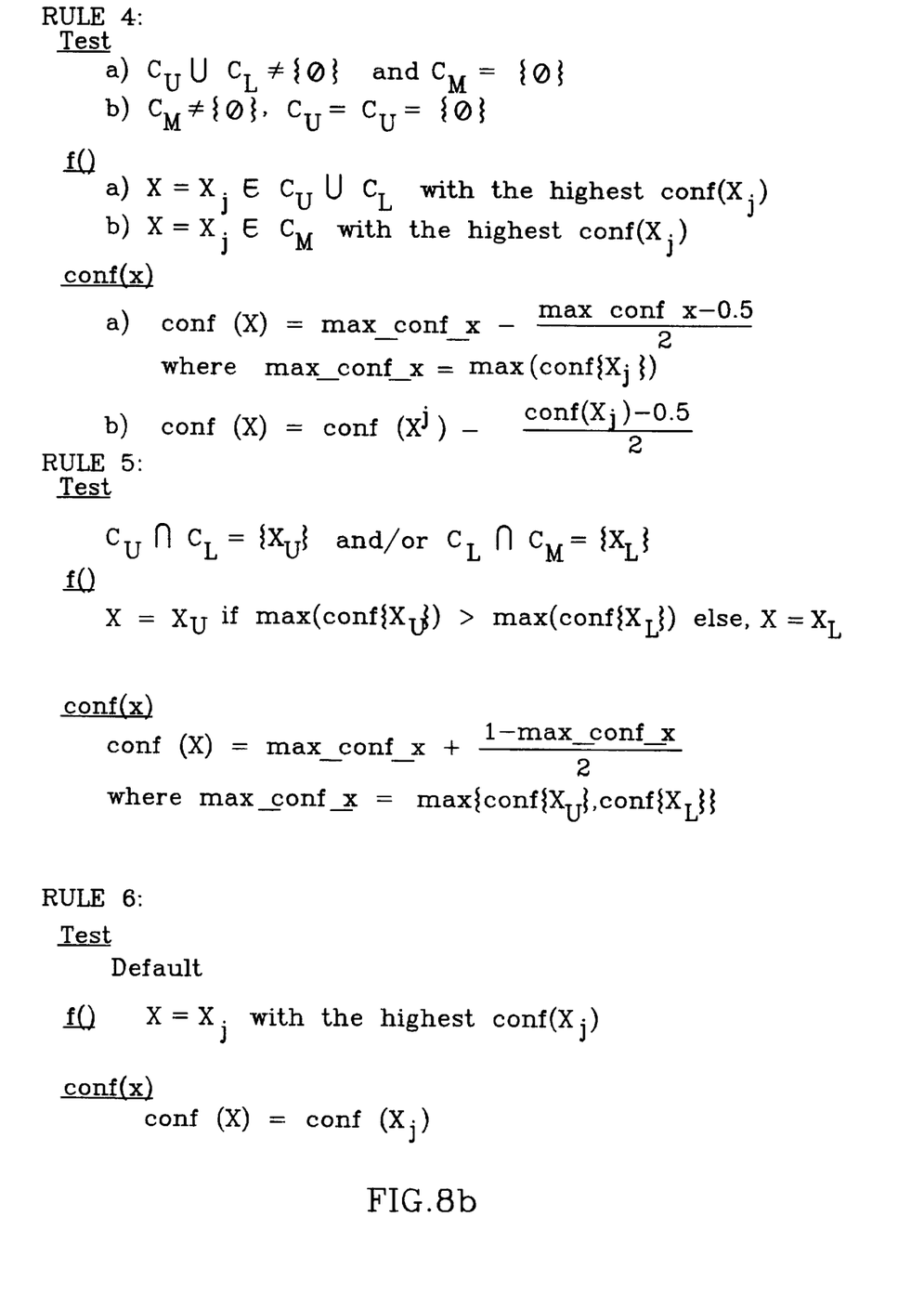

FIGS. 8a and 8b is a table of rules for a specific embodiment of the invention. In this embodiment three ICR systems are used, which detect only upper case alpha characters, only lower case alpha characters and mixed upper/lower case alpha characters. The outputs of the ICR systems are converted to a common case (upper or lower) so that they can be fused together. AEG, Inc. produces an ICR system which has exclusively upper and lower case ICR systems that output the top three candidate character strings and confidence values. Matra, Inc. provides an ICR system that detects mixed upper/lower case alpha characters and produces multiple string outputs. The upper, lower and mixed case ICR systems output sets $C_U$, $C_L$ and $C_M$, respectively, that may contain multiple candidate strings represented generally as $X_U$, $X_L$ and $X_M$. The ICR systems and set of fusion rules are specifically selected to process standardized forms such as tax, census or insurance forms, where case sensitivity is not important but the rules and underlying principles are applicable to other printed documents.

Rule 1: "Complete Recognition Agreement"

The first rule is applied when the ICR systems each detect one and only one candidate character string. This indicates a very strong recognition and a high probability that the fused character string (the only string detected) will be a correct match. Therefore, the fused confidence value is the maximum confidence value produced by the three ICR systems boosted by one half the difference between that maximum value and the maximum possible value of 1. The value one half is selected by trial-and-error during training.

Rule 2: "Purely Uppercase or Lowercase Agreement"

The second rule is applied when either the upper and mixed ICR systems identify the same one character string and the lower ICR system does not detect any strings or the lower and mixed ICR systems identify the same one character string and the upper ICR system does not detect any strings. This also indicates a very strong recognition and a high probability that the fused character string will be a correct match. Therefore, the fused confidence value is boosted using the same equation used in Rule 1.

Rule 3: "Weak Recognition"

The third rule is applied when none of the recognition results have a confidence value higher than preferably 0,5. This value can range between 0.4 and 0.6. This occurs when several relatively weak strings are detected and indicates a very weak recognition. Therefore, the candidate string having the highest associated confidence value is selected and the fused confidence value is reduced by dividing that confidence value by the total number of detected strings plus 1.

Rule 4: "Only One Recognition System Responds"

The fourth rule is applied when only one recognition system responds, which is a relatively weak recognition. In this embodiment, the upper and lower case ICR systems are part of the same system and the mixed upper/lower case ICR system is a separate system. The detected string having the highest confidence value is selected, but its confidence value is reduced by half the difference between it and the 0.5 value specified in Rule 4. Because Rule 3 is tested prior to Rule 4 the confidence value will necessarily be greater than 0.5.

Rule 5: "Uppercase or Lowercase Agreement"

Rule 5 is applied when there is a string common to both the upper and mixed sets and/or a different string common to both the lower and mixed sets. This indicates a relatively strong recognition, although not as strong as Rules 1 or 2. Thus, the confidence of the fused string is boosted relative to is associated confidence value, but by a smaller amount.

Rule 6: "Default Rule"

The default rule is applied in all remaining cases. The string having the maximum confidence is selected as the fused character string and its confidence value is unchanged.

In this particular set of fusion rules, rules 1, 2 and 5 identify combinations of ICR system outputs that tend to produce correct matches. Thus, the confidence values for fused strings selected in accordance with these rules are boosted. Conversely, rule 3 identifies a combination that tends to produce incorrect fused strings. Thus, their confidence values are reduced. Rule 4 tends to be ambiguous, and hence is reduced towards the value 0.5. The remaining cases covered by the default rule are not consistently correct or incorrect, and hence their confidence values remain unchanged.

The ordering of the rules may or may not be important. If each rule is strictly defined to partition the decision space into mutually exclusive subspaces, then the execution order does not matter. However, it is much easier to construct rules that overlap. For example, if the ICR systems detected one and only one string having a maximum confidence value less than the threshold both rules 1 and 3 would apply. Therefore, the designer must decide how that combination should be classified. In the described set of rules, this combination is viewed as a strong recognition that should be reinforced. Thus, rule 1 is executed prior to rule 3.

While several illustrative embodiments of the invention have been shown and described, numerous variations and alternate embodiment will occur to those skilled in the art. Such variations and alternate embodiments are contemplated, and can be made without departing from the spirit and scope of the invention as defined in the appended claims.

We claim:

1. A method of fusing outputs from at least two intelligent character recognition (ICR) systems that operate on image component strings said ICR outputs including sets of candidate character strings having associated confidence values, the permutations of said outputs defining a decision space, the method comprising:

generating a set of rules that partition said decision space into a plurality of subspaces, each of said rules including a test for determining whether said ICR rules including a test for determining whether said ICR outputs lie within its subspace, a membership function for selecting a fused character string from the sets of candidate character strings, and a confidence equation for computing a fused confidence value wherein said set of rules is generated to reduce an average error rate between said fused character string and said image component strings, and further wherein generating the set of rules comprises:

(a) selecting a first one of the rules for said set;

(b) applying said rule to known training data to produce said fused character strings and their confidence values;

(c) comparing said fused character strings to the known training data to determine the average error rate;

(d) adjusting the rule's confidence equation to reduce said average error rate; and (e) selecting the next one of the rules from said set until the set is exhausted and repeating steps b through e;

in response to successive outputs from said ICR systems, performing said tests until one is satisfied to select the applicable rule;

executing the membership function for the applicable rule to select the fused character string;

computing the confidence equation for the applicable rule to assign the fused confidence value; and outputting said fused character string and its confidence value.

2. The method of claim 1, wherein said rules are tested in a specified order to achieve the desired subspace partitioning.

3. The method of claim 1, wherein each of said membership functions select the candidate character string having the highest confidence value that satisfies the associated test.

4. The method of claim 1, wherein said confidence equations boost the fused confidence value relative to the selected candidate character string's confidence value in subspaces in which the fused character string matches the image component string with a high probability and reduce the fused confidence value relative to the selected candidate character string's confidence value in subspace in which the fused character string matches the image component string with a low probability.

5. The method of claim 1, wherein said fused confidence value is initially set equal to the confidence value of the selected candidate character string, said confidence equations are adjusted by:
   modifying the confidence equation to boost the fused confidence value relative to the selected candidate character string's confidence value;
   repeating steps b and c to determine a boosted average error rate;
   modifying the confidence equation to reduce the fused confidence value relative to the selected candidate character string's confidence value;
   repeating steps b and c to determine a reduced average error rate; and
   selecting the modified confidence equation having the lower of the boosted and reduced average error rates.

6. The method of claim 1, wherein comparing the fused character strings to the known training data generates an error rate versus field rejection rate curve where the average error rate is proportional to the area under said curve, said confidence equations being adjusted to reduce said area.

7. A method of recognizing character strings in digital images, comprising:
   providing a digital image of a text document, wherein said text document is a standardized form on which multiple text strings from known data bases are printed in known positions on the form, said ICR systems extracting said text strings as successive ones of said image component strings;
   providing a plurality of intelligent character recognition (ICR) systems that segment the digital image into image component strings and from them generate respective sets of candidate character strings having associated confidence values where the permutations of said candidate character strings define a decision space wherein said ICR systems detect individual characters from respective subsets of the ASCII character set to generate the respective sets of candidate character strings and wherein three of said ICR systems detect individual characters from subsets of the ASCII character set including only upper case alpha characters, only lower case alpha characters and mixed upper and lower case alpha characters, respectively, and output their respective sets of candidate character strings in a common case;
   generating a set of rules that partition said decision space into a plurality of subspaces to reduce an average recognition error rate, each of said ordered rules including a test for determining whether said candidate character strings lie within its subspace, a membership function for selecting a fused character string from the sets of candidate character strings, and a confidence equation for computing a fused confidence value and wherein a first one of said rules includes a test that selects the first rule when one and only one string appears in all three sets, a membership function that selects that one string as the fused character string, and a confidence equation that first selects the maximum confidence value from the three sets and then increases it and wherein a second one of said rules includes a test that selects the second rule when one and only one string appears in the upper and mixed case sets and the lower case set is empty or when one and only one string appears in the lower and mixed case sets and the upper case set is empty, a membership function that selects that one string as the fused character string, and a confidence equation that first selects the maximum confidence value from the sets and then increases it;
   in response to successive sets of candidate character strings, performing said tests until one is satisfied to select the applicable rule;
   executing the membership function for the applicable rule to select the fused character string;
   computing the equation for the applicable rule to assign the fused confidence value; and
   when said fused confidence value exceeds a threshold, transmitting said fused character string to a data base, otherwise rejecting said fused character string and accepting a user generated string for transmission to said data base.

8. The method of claim 7, wherein a third one of said rules includes a test that selects the third rule when all of the candidate character strings have associated confidence value less than a threshold value, a membership function that selects the candidate character sign having the highest confidence value as the fused character string, and a confidence equation that reduces the highest confidence value as a function of the total number of recognized candidate character strings.

9. The method of claim 8, wherein a fourth one of said rules includes a test that selects the fourth rule when only one of the three sets includes a candidate character string, a membership function that selects that one candidate character string as the fused character string, and a confidence equation that reduces the selected string's confidence value to provide the fused confidence value.

10. The method of claim 9, wherein a fifth one of said rules includes a test that selects the fifth rule when at least one of the upper and mixed case sets and the lower and mixed case sets share a common candidate character string, a membership function that selects the common candidate character string having the high confidence value as the fused character string, and a confidence equation that increases the selected common candidate character string's confidence value to provide the fused confidence value.

11. The method of claim 10, wherein a last one of said rules is a default rule that is applied when the first five tests fail, said last rule selecting the candidate character string having the high confidence value as the fused string and assigning its confidence value as the fused confidence value.

12. An intelligent character recognition (ICR) fuser for combining the outputs of a plurality of ICR systems, said ICR outputs including sets of candidate character strings having associated confidence values where the permutations of said ICR outputs define a decision space, comprising:
   a computer programmed with an ordered set of rules that partition said decision space into a plurality of subspaces to reduce an average recognition error rate, each of said rules including a test for determining whether said ICR outputs lie within its subspace, wherein said tests partition said decision space such that the fused character strings selected from a first one of the subspaces have a low error probability and those selected from a second one of the subspaces have a high error probability, at least one membership function for selecting a fused character string from the sets of candidate text strings, wherein each of said membership functions select the candidate character string having the highest confidence value that satisfies the associated test; and at least two confidence equations for computing a fused confidence value, wherein the confidence equation associated with said first subspace boost the fused confidence value relative to the selected candidate character string's confidence value, and the confidence equation associated with second subspace reduces the fused confidence value relative to the selected candidate character string's confidence value.

13. A character recognition system, comprising:

an input storage medium for storing a digital image of a text document wherein said text document is a standardized form on which multiple text document is a standardized form on which multiple text strings from known data bases are printed in known positions on the form, said ICR systems extracting said text strings as successive ones of said image component strings;

a plurality of intelligent character recognition (ICR) systems that segment said digital image to extract successive image component strings and convert them into sets of candidate character strings having associated confidence values where the permutations of said candidate strings define a decision space and wherein said ICR systems detect individual characters from respective subsets of the ASCII character set to generate the respective sets of candidate character strings and wherein three of said ICRs detect individual characters from subsets of the ASCII character set including only upper case alpha characters, only lower case alpha characters and mixed upper and lower case alpha characters, respectively, and output their respective sets of candidate character strings in a common case;

a computer programmed with an ordered set of rules that partition said decision space into a plurality of subspaces to reduce an average recognition error rate, each of said ordered rules including a test for determining whether said sets of candidate character strings lie with its subspace, a membership function for selecting a fused character string from those sets, and a confidence equation for computing a fused confidence value, wherein a first one of said rules includes a test that selects the first rule when one and only one string appears in all three sets, a membership function that selects that one string s the fused character string, and a confidence equation that first selects the maximum confidence value from the three sets and then increases it wherein a second one of said rules includes a test that selects the second rule when one and only one string appears in the upper and mixed case sets and the lower case set is empty or when one and only one string appears in the lower and mixed case sets and the upper case set is empty, a membership function that selects that one string as the fused character string, and a confidence equation that first selects the maximum confidence value from the sets and then increases it;

a manual input device for replacing said fused character string with a user generated string when said fused confidence value is less than a threshold value; and an output storage medium for storing said fused strings and said user generated strings.

14. The character recognition system of claim 13, wherein a third one of said rules includes a test that selects the third rule when all of the candidate character strings have associated confidence values less than a threshold value, a membership function that selects the candidate character string having the highest confidence value as the fused character string, and a confidence equation that reduces the highest confidence value as a function of the total number of recognized candidate character strings.

15. The character recognition system of claim 14, wherein a fourth one of said rules includes a test that selects the fourth rule when only one of the three sets includes a candidate character string, a membership function that selects that one candidate character string as the fused character string, and a confidence equation that reduces the selected string's confidence value to provide the fused confidence value.

16. The character recognition system of claim 15, wherein a fifth one of said rules includes a test that selects the fifth rule when at least one of the upper and mixed case sets and the lower and mixed case sets share a common candidate character string, a membership function that selects the common candidate character string having the high confidence value as the fused character string, and a confidence equation that increases the selected common candidate character string's confidence value to provide the fused confidence value.

17. The character recognition system of claim 16, wherein a last one of said rules is a default rule that is applied when the first five tests fail, said last rule selecting the candidate character string having the high confidence value as the fused string and assigning its confidence value as the fused confidence value.

* * * * *

UNITED STATES PATENT AND TRADEMARK OFFICE
CERTIFICATE OF CORRECTION

PATENT NO. : 5,970,171
DATED : October 19, 1999
INVENTOR(S) : Baraghimian, et al Page 1 of 2

It is certified that error appears in the above-indentified patent and that said Letters Patent is hereby corrected as shown below:

Face Page [56] U.S. PATENT DOCUMENTS; line 1, delete "4,580,142" and insert --4,589,142--.

Face Page [56] OTHER PUBLICATIONS; Column 2, line 5, after "recognition", delete "Yu", and insert --Xu--.

Face Page [56] OTHER PUBLICATIONS; after the last publication insert --Sung-Bae Cho and Jin H. Kim, "Combining Multiple Neural Networks by Fuzzy Integral for Robust Classification", IEEE Transactions on Systems, Man, and Cybernetics, Vol. 25, No. 2, pp. 380-384, Feb. 1995.--.

Column 5, line 33, after "fixes" delete "string" and insert --strings---.

Column 5, line 43, after "strings" delete "$Xj_i$" and insert --$X_{ji}$--.

Column 5, line 63, after "as", insert --a--.

Column 6, line 27, after "some" delete "case" and insert --cases--.

Column 6, line 31, after "of", delete "know", and insert --known--.

Column 7, line 35, after "preferably", delete "0,5" and insert --0.5--.

Column 7, line 51, after "in", delete "Rule 4", and insert --Rule 3--.

Column 11, line 16, after "with" insert --said--.

UNITED STATES PATENT AND TRADEMARK OFFICE
CERTIFICATE OF CORRECTION

PATENT NO. : 5,970,171
DATED : October 19, 1999
INVENTOR(S) : Baraghimian, et al It is certified that error appears in the above-indentified patent and that said Letters Patent is hereby corrected as shown below:

Column 12, line 1, after "string", delete "s", and insert --as--.

Signed and Sealed this

Seventeenth Day of April, 2001

*Attest:*

NICHOLAS P. GODICI

*Attesting Officer*  Acting Director of the United States Patent and Trademark Office